Aug. 16, 1966 R. E. STOKELY 3,266,269
SEALING ELEMENT
Filed Oct. 25, 1962

Inventor
Raymond E. Stokely
By: Joseph W. Malleck Atty.

United States Patent Office 3,266,269
Patented August 16, 1966

3,266,269
SEALING ELEMENT
Raymond E. Stokely, Rockford, Ill., assignor to Borg-Warner Corporation, Chicago, Ill., a corporation of Illinois
Filed Oct. 25, 1962, Ser. No. 232,977
1 Claim. (Cl. 64—17)

This invention relates to sealing devices and more particularly to sealing rings adapted to seal lubricating oil within trunnion bearings of universal joints, although not limited to this latter use.

It is a primary object of this invention to provide an improved sealing element which is adapted to maintain sealing relationship against surfaces which may move relative thereto in planes perpendicular to each other while permitting slight fluid bleed during such sealing relationship to accommodate outward passage of air and old lubricant during pressure lubrication.

Another object in accordance with the preceding object is to provide a universal joint mechanism employing such sealing ring and which is adapted to be effectively held against outward movement and seal more tightly as a result of centrifugal force during operation of the joint.

A more specific object of this invention is to provide an annular sealing ring of flexible material having a first annular sealing lip adapted to flex in a radial direction thereof and a second annular sealing lip adapted to flex in an axial direction of said ring.

Still another object of this invention is to provide a simple, economical annular sealing ring for sealing between trunnion and mating bearing of a universal joint, the ring specifically having a first annular sealing lip adapted to seal against the cylindrical surface of the trunnion and accommodate radial movement thereof while maintaining a sealing relationship, and a second annular sealing lip extending outwardly from the same side of said ring as said first sealing lip and adapted to seal against a radially extending surface of the bearing, said second sealing lip being adapted to flex radially outwardly and permit slight bleeding during the sealing relationship with said radial surface, said ring also having an annular nose portion adapted to abut between the trunnion and bearing at a side of said ring opposite from said sealing lips. A specific feature of this object is the ability of this ring to operatively fit within L-shaped grooves facing each other and formed in the respective surfaces of the trunnion and bearing.

This invention consists of the novel constructions, arrangements and devices to be hereinafter described and claimed for carrying out the above stated objects and such other objects as will be apparent from the following description of a preferred form of the invention, illustrated with reference to the accompanying drawings, wherein:

Figure 1:
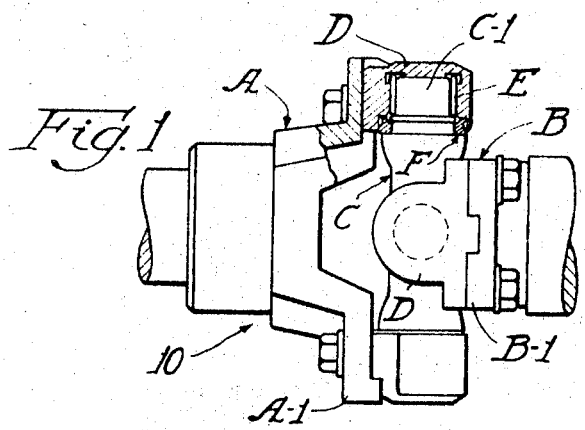
FIGURE 1 is a schematic and partly sectional illustration of a universal joint employing sealing elements incorporating the features of this invention.
Figure 2:
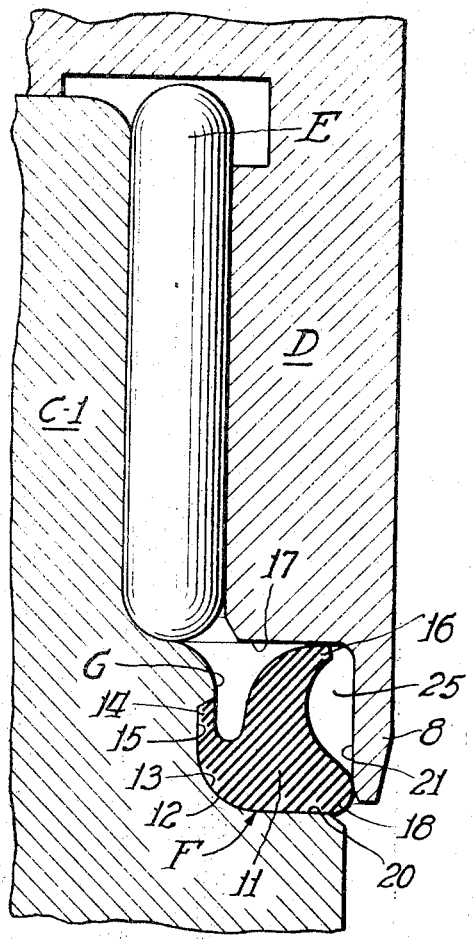
FIGURE 2 is an enlarged sectional portion of the joint and illustrates the seal in one operative position relative to adjacent members.
Figure 4:
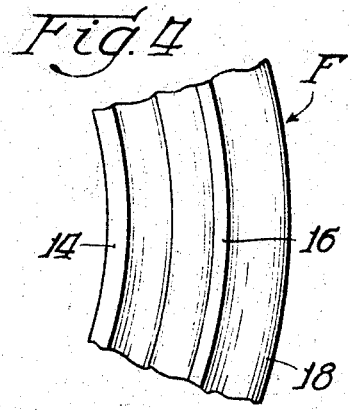
FIGURE 4 is a framentary plan view of the sealing ring.
Figure 3:
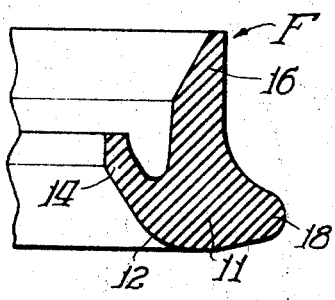
FIGURE 3 is a fragmentary sectional view of the sealing ring and illustrates the unflexed condition thereof.

Turning now more particularly to the drawings and specifically to FIGURE 1, there is shown a preferred embodiment of a universal joint, generally designated 10, and broadly comprising a pair of yoke members A and B, one representing the driving input means and the other representing the driven or output means of the joint. Cross C carries a plurality of trunnion portions C–1, each received within bearing cups D, the latter being secured within the ends of arms A–1 and B–1 of the yoke members. Disposed between the inner cylindrical surface of the bearing cups D and the outer cylindrical surface of the trunnion portions C–1 is a plurality of roller bearings E adapted for circulation along said surfaces.

A sealing element F is employed to seal between the margin G of the trunnion portion disposed inwardly of the needle bearings and the terminating portion 8 of the cups D so as to retain lubricating oil within the chamber occupied in part by the needle bearings. The sealing element F comprises an endless ring or central body portion 11 consisting of a resilient material such as neoprene rubber; the annular central portion 11 has a quarter round surface section 12 adapted to fit snugly against a similar shaped quarter round surface formed as part of an L-shaped recess 13 of the trunnion portion C–1.

An annular sealing or primary lip 14 extends outwardly from the body portion 11 and is adapted to seal against a cylindrical surface 15 of the trunnion portion C–1 forming part of the recess 13, the cylindrical surface 15 being concentric with the central axis of the trunnion portion. The primary sealing lip 14 is adapted to flex in a radial direction of the trunnion portion and therefore accommodate relative movement of the sealing ring and trunnion portion within a radial plane of the trunnion portion.

A secondary lip 16 extends in an axial direction outwardly from the main body portion 11 of the sealing element and is adapted to sealingly engage a flat, annular surface 17 formed as part of an L-shaped recess 25 in the terminating portion of each cup D; the recess is adapted to be oppositely facing the somewhat L-shaped recess 13 formed in the trunnion portion C–1.

The secondary lip 16 is adapted to flex in an axial direction of the sealing element to accommodate relative movement between surface 17 of the bearing cup and the sealing element during operation of the joint.

A nose portion 18 is formed as an annular protrusion on the main body portion 11 of the sealing element and is adapted to bridge the gap existing between the corners of the recesses formed in the bearing cup and trunnion portion and particularly where surfaces 20 and 21 become most closely spaced. The nose portion is adapted to lie on a side of the sealing element opposite from that which the primary and secondary lips extend. The nose portion is heavier in mass than the sealing lips and is not adapted to flex in the manner of the aforementioned lips.

It should be particularly noted in connection with the above construction that the secondary lip 16 permits bleeding of fluid in an outwardly direction thereof so as to permit passage of air or old lubrication when the space containing the needle bearing is pressure lubricated by conventional means. Furthermore, the surface 17 acts as an automatic centrifugal retention means so as to position the sealing element during operation of the joint and prevent it being damaged by extrusion against other parts of the joint.

While this invention has been described in connection with certain specific embodiments thereof, it is to be understood that this is by way of illustration and not by way of limitation; and the scope of this invention is defined solely by the appended claim which should be construed as broadly as the prior art will permit.

I claim:

A sealing device for a universal joint having a cylindrically shaped trunnion rotatably received within a bearing having a flat radially extending surface, comprising an annular member having a body adapted to fit about the cylindrical surface of said trunnion, means on one side of said body adapted to prevent movement of said annular member in one axial direction thereof, said annular member having a first annular lip projecting radially inward from a radially inner side thereof and adapted to flex in a radial direction of said annular member for sealing against the outer surface of said trunnion, said annular member also having a second annular sealing lip projecting from another side of said member opposite said one side and adapted to seal against said flat radially extending surface of said bearing, said second lip being adapted to flex in a radially outwardly direction to accommodate axial movement of said bearing relative to said trunnion.

References Cited by the Examiner

UNITED STATES PATENTS

| | | | |
|---|---|---|---|
| 2,626,839 | 1/1953 | Creson et al. | 308—36.1 |
| 2,773,367 | 12/1956 | Slaght | 64—17 |
| 2,794,693 | 6/1957 | Burkhalter et al. | 308—212 |
| 2,868,574 | 1/1959 | Rich. | |
| 2,908,536 | 10/1959 | Dickey | 308—187.1 |
| 2,916,896 | 12/1959 | Miller | 64—17 |
| 2,990,201 | 6/1961 | Stephens | 308—187.2 |
| 2,993,711 | 7/1961 | Peras | 277—82 |
| 3,091,948 | 6/1963 | Zeller | 64—17 |

MILTON KAUFMAN, *Primary Examiner.*

ROBERT C. RIORDON, *Examiner.*

H. C. COE, *Assistant Examiner.*